United States Patent [19]
Soules et al.

[11] Patent Number: 5,705,883
[45] Date of Patent: Jan. 6, 1998

[54] REDUCED LENGTH COMPACT FLUORESCENT LAMP AND METHOD OF FORMING SAME

[75] Inventors: Thomas F. Soules, Richmond Heights; Jennifer L Barry, Bay Village; Frederic F. Ahlgren, Euclid; Alexander L. Guba, South Euclid; Erwin G. Steinbrenner, Parma Heights, all of Ohio

[73] Assignee: General Electric Company, Schenectady, N.Y.

[21] Appl. No.: 414,429

[22] Filed: Mar. 31, 1995

[51] Int. Cl.[6] .................... H01J 17/16; H01J 61/30
[52] U.S. Cl. ............... 313/318.09; 313/493; 313/634
[58] Field of Search ................ 313/318.02, 318.09, 313/493, 634; 439/611, 612

[56] References Cited

U.S. PATENT DOCUMENTS

| | | | |
|---|---|---|---|
| 2,778,462 | 4/1957 | MacFarlane | 192/56.1 |
| 3,764,844 | 10/1973 | Schmidt | 313/110 |
| 3,886,396 | 5/1975 | Hammer et al. | 313/486 |
| 3,898,495 | 8/1975 | Livera | 313/51 |
| 3,953,761 | 4/1976 | Giudice | 315/71 |
| 4,503,360 | 3/1985 | Bedel | 315/112 |
| 4,694,215 | 9/1987 | Hofmann | 313/44 |
| 4,797,594 | 1/1989 | Sigai et al. | 313/488 |
| 5,128,590 | 7/1992 | Holzer | 313/318.09 |
| 5,150,965 | 9/1992 | Fox | 313/1 |
| 5,204,580 | 4/1993 | Baba et al. | 313/318.09 |
| 5,220,236 | 6/1993 | Washburn et al. | 313/26 |
| 5,243,256 | 9/1993 | Holzer | 313/634 |
| 5,331,168 | 7/1994 | Beaubien et al. | 250/372 |
| 5,341,068 | 8/1994 | Nerone | 315/219 |
| 5,361,017 | 11/1994 | Krause | 315/151 |

FOREIGN PATENT DOCUMENTS

| | | | |
|---|---|---|---|
| 0066495 | 12/1982 | European Pat. Off. | 313/634 |
| 4133077A1 | 4/1993 | Germany. | |
| WO 9429895 | 12/1994 | WIPO. | |

*Primary Examiner*—Sandra L. O'shea
*Assistant Examiner*—Jay M. Patidar
*Attorney, Agent, or Firm*—George E. Hawranko

[57] ABSTRACT

A low pressure discharge lamp, particularly a compact fluorescent lamp, achieves an overall reduction in height by orienting ends of the envelope radially inward for connection to the base. This advantageously positions the electrodes housed within the envelope away from the base. Moreover, this mounting arrangement provides resistance against pull out forces and elimination of a cement to secure the envelope to the base, as well as other improved heat transfer benefits.

19 Claims, 4 Drawing Sheets

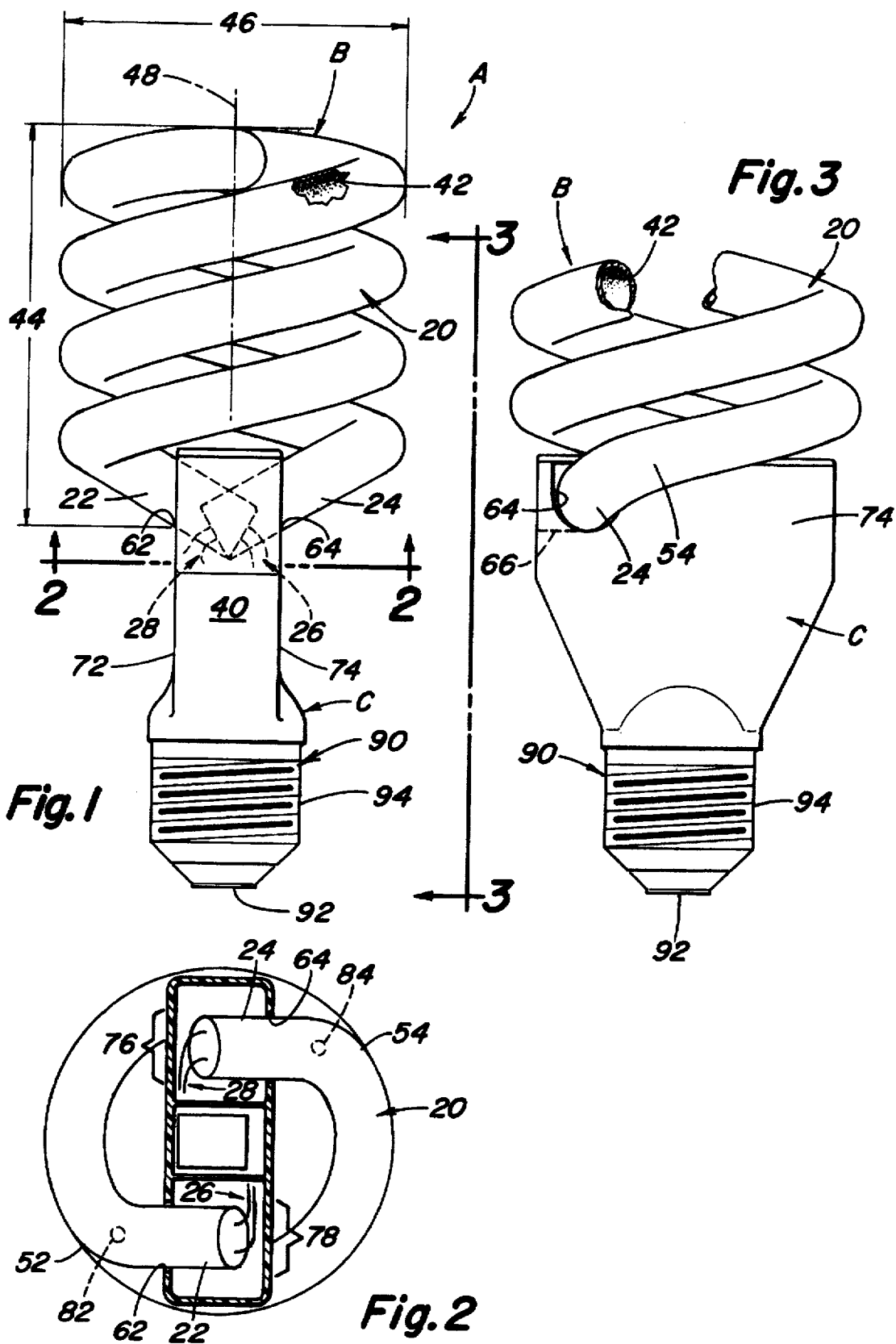

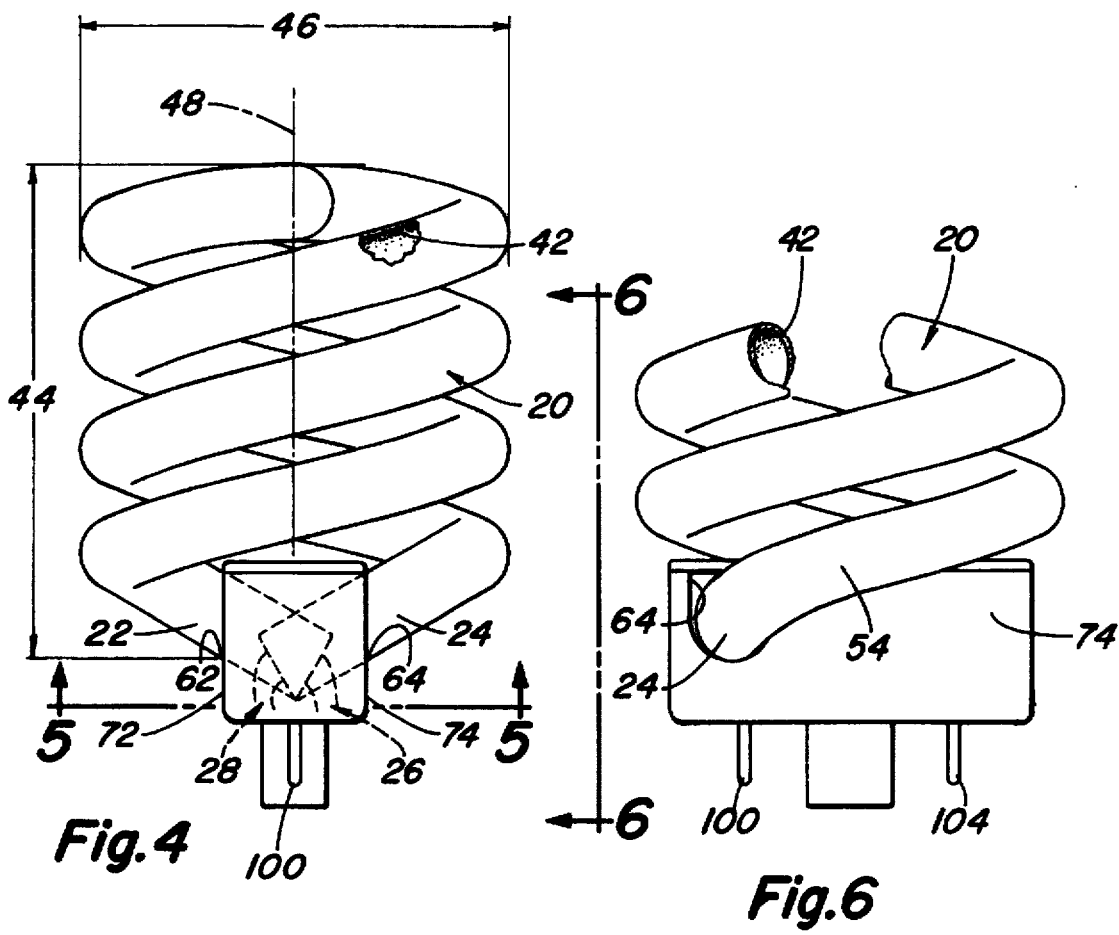
Fig.4
Fig.6
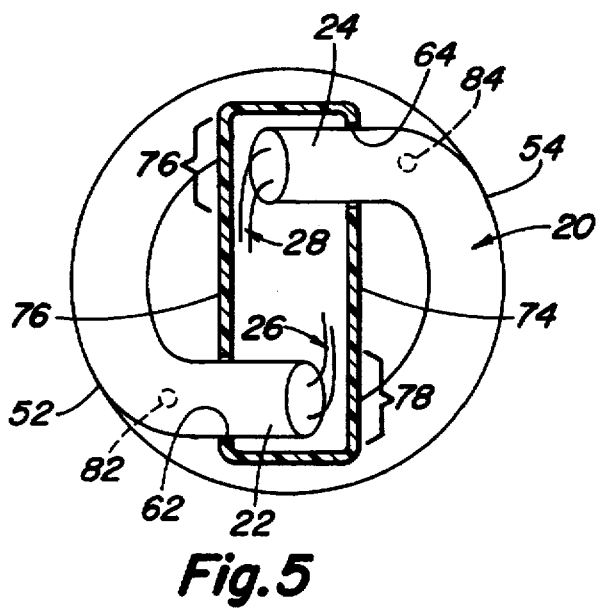
Fig.5

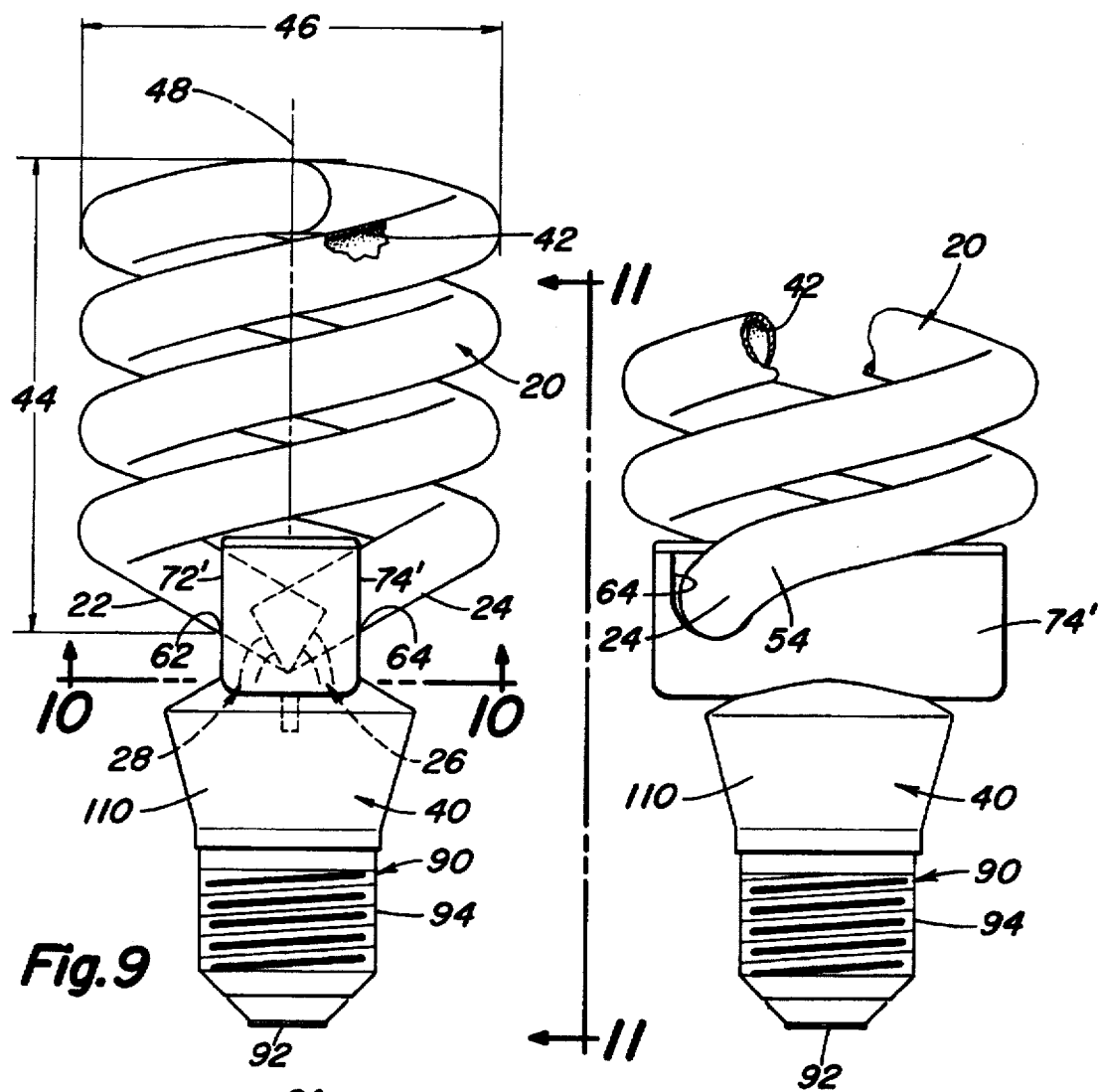
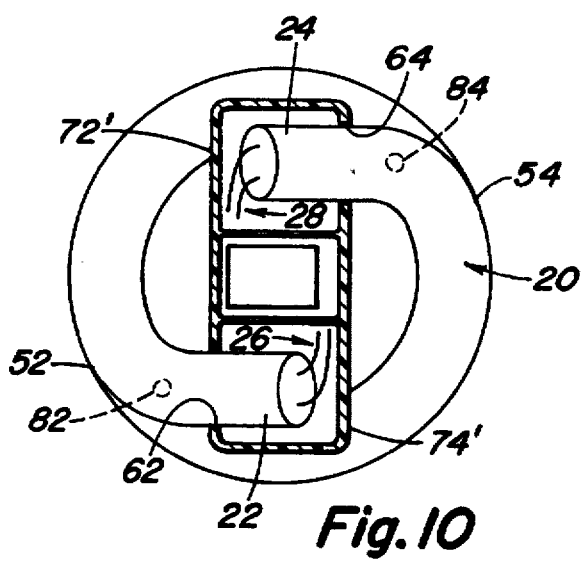

REDUCED LENGTH COMPACT FLUORESCENT LAMP AND METHOD OF FORMING SAME

BACKGROUND OF THE INVENTION

This invention pertains to the art of discharge lamps and more particularly to low pressure discharge lamps. The invention is specifically applicable to a compact fluorescent lamp having a coiled configuration, preferably in the shape of a double helix, and will be described with reference thereto. However, it will be appreciated that the invention has broader applications and may be advantageously employed in environments and applications related to the preferred embodiments described below.

In recent years, there has been a tremendous surge in the use of compact fluorescent lamps in place of conventional incandescent lamps. Consumers and commercial establishments are converting to compact fluorescent lamps because of the longer life and improved energy efficiency of the compact fluorescent lamp over that of the conventional incandescent lamp.

One example of a compact fluorescent lamp is shown and described in U.S. Pat. No. 4,503,360 issued to D. E. Bedel on Mar. 5, 1985. As generally described in that patent and as well known in the art, a typical compact fluorescent lamp forms a continuous lamp envelope or discharge tube by joining together a plurality of tube portions. The tube portions are usually oriented to extend outwardly a predetermined length from a base or housing.

In order to compare favorably to incandescent lamps, higher lumen output levels must be obtained so that a compact fluorescent lamp achieves substantially the same lumen output as, for example, a one hundred (100) watt incandescent lamp. The average light output for a one hundred (100) watt incandescent lamp is one thousand (1700) lumens at one hundred (100) hours. A compact fluorescent lamp in which the discharge tube has an inner diameter of ten (10) millimeters (mm) and an argon gas fill pressure of three to four (3–4) Torr operating at approximately twenty four (24) watts will require an arc length of about 610 mm to achieve this same lumen output. Additional discharge tube length is required to accommodate the electrodes and ends resulting in an overall discharge tube length of approximately 670 mm.

Lamp manufacturers have used multiple bent tubes connected at bridge portions in attempts to achieve extended discharge tube lengths in a relatively compact area. An arc weaves between the electrodes, up and down, through and around the carousel of bent tubes. Alternatively, a coiled or helical configuration has been proposed as another preferred design for accommodating an extended discharge tube length in a compact area. The helical configuration provides a more compact overall length, approximately 75 mm by 60 mm, for example. For example, coiled configurations are shown and described in published German Application No. DE 4133077 filed Oct. 2, 1991 and assigned to Narva Berliner Gluhlampenwerk GmbH. Another example of a coiled configuration in a compact fluorescent lamp assembly is shown and described in published PCT application WO 9429895 assigned to Lee O Y.

In both the German patent application and the PCT publication, downwardly extending ends or legs of the helically configured discharge tube contribute to overall lamp length. Moreover, a ballast assembly, which provides the electrical potential for exciting the gas fill to a discharge state, also adds to the overall lamp length, resulting in a compact fluorescent lamp assembly that fails to fit within the area defined by harps of commercially available table lamps that accommodate a 100 watt or 150 watt incandescent lamp.

Although continued development in the ballast assemblies have resulted in reduced size, these more compact designs still fail to adequately address various heat transfer considerations. The heated electrodes in the discharge tube can damage a plastic housing used to support the compact fluorescent lamp. Additionally, the electrodes are the primary source of heat transmitted to the ballast electronic components.

One proposed solution to these heat transfer concerns is to raise the height of the electrodes in compact fluorescent lamps having vertically extending legs. This positions the electrodes further from the housing and the ballast assembly so that the effect of elevated temperatures is counteracted. Unfortunately, this solution adds to the overall height of the lamp. Since a primary goal of present designers is to enhance acceptance and widespread use of the compact fluorescent lamp by reducing the height of the lamp assembly, this solution to the heat transfer problems merely complicates the objective of reduced height of the lamp assembly.

Still other solutions to manufacturing a more compact fluorescent arc tube that dissipates approximately 24 watts have been proposed. These proposals, though, have their attendant disadvantages. For example, the length of the discharge tube can be reduced by operating the lamp at a higher current. Because of the negative volt-ampere characteristics of the discharge, increasingly large currents are required for increasing lamp wattage. On the other hand, electrode losses increase in direct proportion to the current. Therefore, lamps operating at higher currents suffer a higher percentage of electrode and wall losses. In addition, increasing the current increases wall loading which leads to higher envelope wall temperatures. This, in turn, makes it more difficult to achieve an optimum cold spot temperature for mercury vapor pressure control. Optimum light output then requires the use of a high temperature amalgam. Still further, higher current levels result in more power being dissipated by ballast resistors and induction coils thereby increasing plastic and electronic component temperatures and lowering the efficiency of the ballast.

Another proposed solution to reducing the length of the discharge tube is to increase the electric field in the plasma. Generally, this is done by adding neon to the buffer gas or decreasing the discharge tube diameter. Both of these solutions result in an increased electric field in the plasma but increase wall loading and lead to a shorter cathode life.

Still another concern with compact fluorescent lamps is to provide good mechanical support of the discharge tube on the housing. Typically, a cement provides the sole manner of resisting pull-out forces exerted on the vertically oriented legs that enter the base. Eliminating the cement from the lamp assembly would be beneficial since manufacturing time for the compact fluorescent lamp will then be reduced at a desired cost savings.

Accordingly, a compact fluorescent lamp having any of the following characteristics of (i) reduced height without increasing wall loading, (ii) improved thermal characteristics by reducing the temperature of the lamp wall at the base of the assembly and reducing the transfer of heat to the ballast components, (iii) resistance to pull-out forces, and (iv) the shape and performance of a conventional A-line incandescent lamp is desired.

SUMMARY OF THE INVENTION

The present invention provides a low pressure discharge lamp having a reduced height that provides an equivalent light output of a 100 watt incandescent lamp.

According to principles of the present invention, a compact fluorescent lamp having an envelope formed in a coiled configuration and containing a gas fill energizeable to a discharge state is provided. Ends of the coiled envelope, or discharge tube, are received through first and second openings in the base in a direction generally non-parallel to a longitudinal or central axis of the lamp to reduce the overall height.

According to another aspect of the invention, the ends of the tube are bent radially inward from the coiled configuration to provide resistance to pull-out forces imposed along the central axial direction and additionally optimize heat transfer characteristics of the lamp.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings. These include:

FIG. 1 is an elevational view of a preferred compact fluorescent lamp formed in accordance with the subject invention;

FIG. 2 is a view taken generally along the line 2—2 of FIG. 1;

FIG. 3 is an elevational view taken generally along the line 3—3 of FIG. 1;

FIG. 4 is an elevational view of a plug-in compact fluorescent lamp formed in accordance with the teachings of the subject invention;

FIG. 5 is a view taken generally along the line 5—5 of FIG. 4;

FIG. 6 is an elevational view taken generally along the line 6—6 of FIG. 4.;

FIG. 9 is an elevational view of an integral or plug-in compact fluorescent lamp formed in accordance with the teachings of the subject invention;

FIG. 10 is a view taken generally along the line 10—10 of FIG. 9; and

FIG. 11 is a view taken generally along the line 11—11 of FIG. 9.

DETAILED DESCRIPTION OF THE PREFERRED EMBODIMENTS

Figure 7:
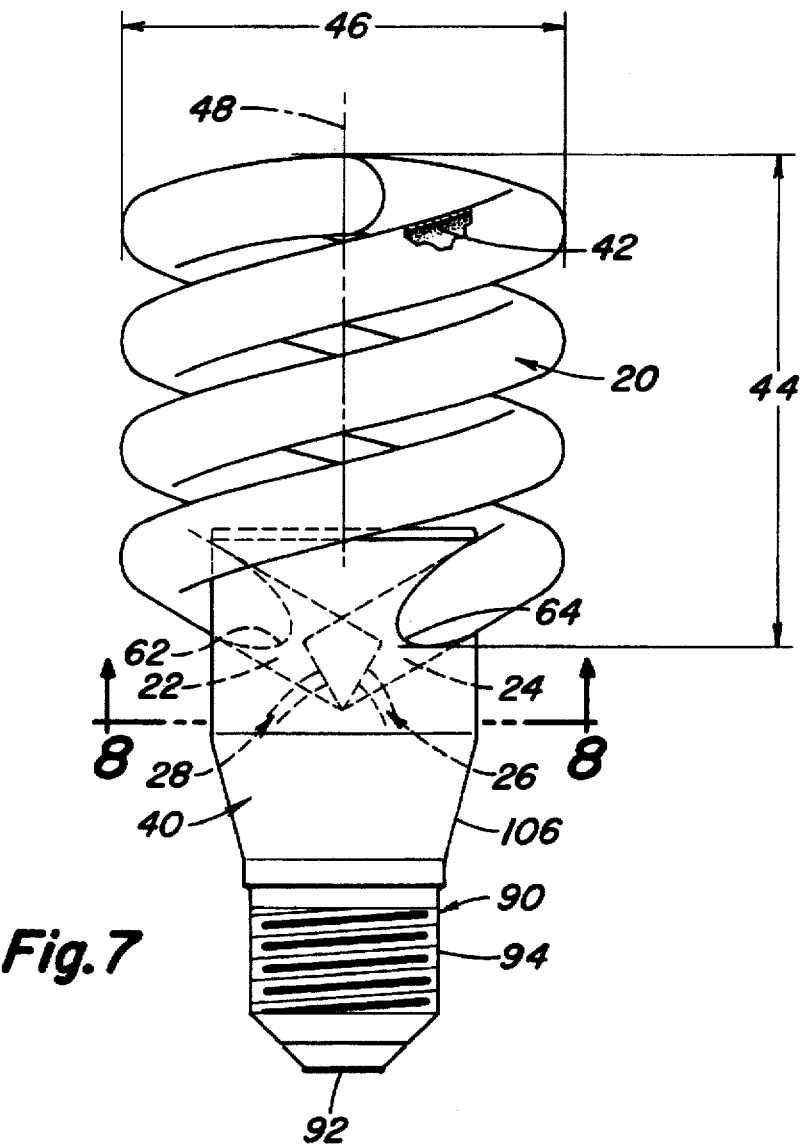
FIG. 7 is an elevational view of a compact fluorescent lamp used with a cylindrical ballast housing.

Referring now to the drawings wherein the showings are for the purposes of illustrating the preferred embodiments of the invention only and not for purposes of limiting same, the FIGURES show a low pressure discharge lamp assembly A, particularly, a compact fluorescent lamp assembly, having an envelope B and a base or housing C.

More particularly, and turning first to the embodiment of FIGS. 1–3, a compact fluorescent lamp with an integral ballast lamp is shown. The envelope B is defined by an elongated tube 20 having first and second ends 22, 24. As is generally known in the art, the envelope is sealed from the external environment and contains a gas fill which is energized to a discharge state by applying and maintaining an electrical potential from a power source. Free electrons from the electrodes are accelerated by the potential difference and the kinetic energy of the electrons is transformed into internal energy of atoms in the gas fill upon collision with the free electrons. As the atoms relax to a lower energy state, internal energy of the atoms is dissipated as radiation.

Typically, the gas fill includes mercury and a noble gas, such as argon, sealed in a gas tight manner in the discharge tube. Electrode assemblies are provided at the closed ends of the discharge tube where electrical leads 26, 28 extend outwardly from the sealed ends. The leads 26, 28 have a first portion disposed within the sealed tube and an outer portion external of the sealed tube for connection with the powered circuit. Suitable connections are made to the leads from a ballast or driving circuit 40, details of which are known in the art.

A phosphor coating 42 is provided on the internal wall of the discharge tube. The coating converts ultraviolet radiation from the mercury additive excited in the argon fill gas into visible light. Again, particular details of the coating are well known in the art so that further discussion herein is deemed unnecessary to a full and complete understanding of the present invention.

Rather than increasing wall loading, as other solutions to reducing overall height of the light assembly require, the present invention reduces the overall length of the lamp by bending the ends 22, 24 radially inward. In the documents cited in the Background of the Invention portion of this application, the prior art manner of terminating the first and second ends of the discharge lamp is shown. Specifically, the legs of the discharge tube are oriented in a generally vertical direction which, as described above, contributes to an extended length of the compact fluorescent lamp that may not be compatible with harp sizes of conventional table lamps. Here, the discharge tube is formed in a coiled configuration, preferably a double helix configuration, where the first and second ends are disposed at one end of the completed envelope. The double helix forms a continuous spiral path over a predetermined length 44 which is sufficient to provide a lumen output equivalent to a 100 watt incandescent lamp.

As shown in FIG. 1, the discharge tube has a generally constant diameter 46 over its entire longitudinal extent 44. That is, the tube is formed into the double helix about a central or longitudinal axis 48. As shown in FIG. 1, the tube completes approximately one and a half turns in each helix, although a greater or lesser number of turns may be required to obtain different envelope lengths for a preselected lamp output. The coil configuration is the most compact structure for any given length and diameter of narrow tubing. Thus, the ability to further reduce the length or height of the envelope for an already compact structure becomes significant.

As best illustrated in FIG. 2, each of the ends 22, 24 is turned radially inward at areas 52, 54, respectively. Rather than continuing the generally constant diameter helical configuration, the diametrically opposite end portions are bent radially inward at 52, 54 so that the ends enter corresponding openings 62, 64 in the base. Thus, as represented in FIGS. 2 and 3, the ends enter the base on generally diametrically opposite portions thereof. Moreover, the radial bend orients the ends generally perpendicular to the axis 48. In this manner, pull-out forces exerted on the envelope in a direction generally parallel to the axis 48 will be effectively resisted by the radial mounting of the envelope in the base. It is even contemplated that the opening 62, if formed as a C-shaped groove, can be defined by a snap-fit structure represented by dotted line 64, 66 to complete the peripheral connection about the ends of the envelope. Such a structural arrangement may eliminate the need of any cement to secure the envelope to the base, or, if desired, may be used in conjunction with a reduced amount of cement. This, in turn, would lead to decreased costs and time associated with manufacture of the compact fluorescent lamp in accordance with known techniques.

As shown in FIG. 2, a pair of vertical walls or plates 72, 74 serve as sides of the upper portion of the ballast housing. Each plate has a radial opening 62, 64 that receives an inwardly directed end of the envelope. Moreover, each plate serves as a backing to limit continued insertion of the opposite leg beyond the other plate as generally represented by regions 76, 78 (FIG. 2).

As is also represented in FIG. 2, electrodes 82, 84 are spaced outwardly from the walls 72, 74 of the base. This is the region of highest temperature associated with the discharge lamp. Since the base is often formed of a plastic material, it is desirable to maximize the distance of the electrodes from the housing and provide sufficient heat sinking to provide good heat exchange with the external environment. The plastic wall functions as a heat shield in its own right to limit heat radiated by the electrodes from directly entering the ballast housing area. Moreover, the radially bent ends are disposed in a generally horizontal direction and easily compartmentalized to prevent the heat generated at the electrodes from entering the ballast region of the base.

Since the ends of the envelope are optimally situated for heat transfer with the external environment, the discharge tube ends advantageously provide a cold spot that fixes the vapor pressure of the mercury or amalgam in the lamp.

The housing or base 90 of FIGS. 1–3 is also provided with an eyelet 92 and externally threaded shell 94 on an end of the base for cooperation with a threaded socket of an associated lamp (not shown). Appropriate electrical connections are established between the eyelet and shell 92, 94 and the associated circuitry of the ballast so that power from an external source is regulated by the ballast to operate the discharge lamp.

The embodiment of FIGS. 4–6 illustrates the application of the present invention to a plug-in lamp configuration. Much of the structure is similar to that of the embodiment of FIGS. 1–3 so that like numerals refer to like elements and the previous description is applicable to this embodiment. As will be apparent, however, the ballast is not integrally formed in the housing, but is a separate component. Pin type connections 100, 102, and 104 extend from the base for a cooperative receipt in a ballast housing (not shown).

Figure 8:
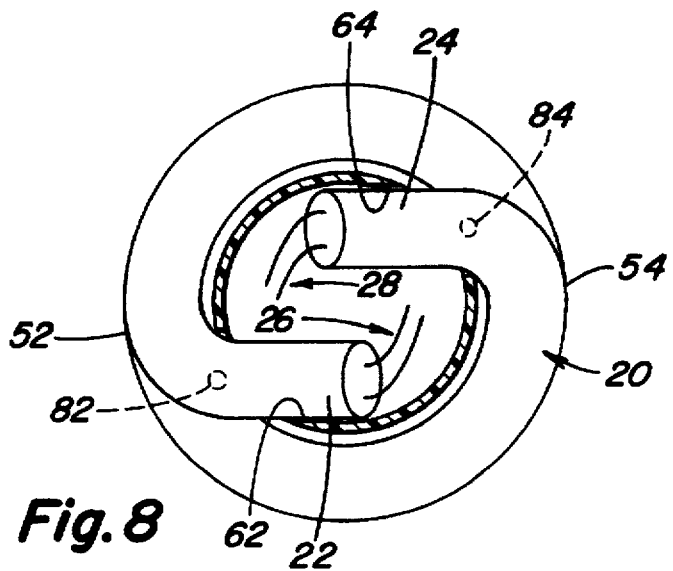
FIG. 8 is a view taken generally along the line 8—8 of FIG. 7.

In the embodiment of FIGS. 7 and 8, a more compact ballast housing, such as one using integrated circuits, is illustrated. It is contemplated that the scale and size of this type of housing will become increasingly smaller as ballast technology is developed. If, in fact, a ballast housing is miniaturized to be no larger than a standard Edison base used in incandescent lamps, a direct connection between the radially directed ends of the envelope of the ballast housing may be possible. In the meantime, a tapered arrangement as represented at 106 is necessary to complete the transition between the ballast region of the housing and the Edison-style base.

The embodiment of FIGS. 9–11 represents a hybridization of concepts incorporated in the previous embodiments. A pair of plates 72', 74' provide for ease of connection of the lamp envelope to the base. Moreover, the plates compartmentalize the ends of the discharge tube to provide advantageous heat transfer benefits in a manner as described above. Additionally, a cylindrical portion or bottom region 110 of the base provides additional area for housing the ballast components than is provided in the embodiment of FIGS. 1–3. The ballast components are physically separated from the envelope by virtue of the compartmentalized plates that receive the ends of the envelopes. Moreover, the electrodes are still positioned radially outward of the housing so that a temperature effect on the base is minimized.

A compact fluorescent lamp formed in accordance with the teachings enumerated above results in a lamp that delivers approximately one thousand seven hundred (1700) lumens at one hundred (100) hours while dissipating approximately twenty four (24) watts. The discharge tube has an average inner diameter of approximately ten (10) mm in an argon gas fill pressurized to three to four (3–4) torr. The overall length of the envelope is approximately six hundred seventy (670) mm by directing the ends radially inward and non-essential leg length common in prior arrangements is eliminated to reduce the overall height of the lamp assembly.

The ballast housing essentially overlaps the length of the first coil of the lamp when compared to prior arrangements due to the radial mounting of the envelope ends to the housing instead of forming vertically extending legs. These combined effects result in an overall reduction in lamp height of around thirteen (13) mm. Thus, the compact fluorescent lamp approximates the footprint of a one hundred fifty (150) watt incandescent lamp so that it fits within most table lamp harps and reflector fixtures.

By positioning the electrodes near the leg bend, a main source of heat transmitted to the ballast housing and components is positioned well away from the plastic housing. This is accomplished without having to raise the overall height of the electrodes as is necessary in vertically oriented legs used in the prior art.

Compartmentalization of the heat radiated by the electrodes prevents the heat from directly entering the ballast housing. This can be accomplished without the addition of a heat shield between the ends of the envelope and the ballast component board, a common prior art solution which adds to the overall length of the lamp.

The spacing of the electrodes from the ends of the tube also provides a cold spot that fixes the vapor pressure of mercury or amalgam.

Therefore, in summary, a compact fluorescent lamp in which both ends of the double helix or coil are disposed on the same end of the lamp is provided. The overall lamp geometry provides for reduced height of the lamp by directing the ends of the envelope radially inward, rather than vertically downward, for mounting into the base. Moreover, this geometry is equally applicable to lamps in which the base is integrally formed with the ballast components therein, or where the ballast is contained in a separate housing, and where the housing may adopt a number of different configurations.

The invention has been described with reference to the preferred embodiments. Obviously, modifications will occur to others upon a reading and understanding of this specification and this invention is intended to include same insofar as they come within the scope of the appended claims or the equivalents thereof.

Having thus described the invention, it is now claimed:

1. A low pressure discharge lamp assembly comprising:
    an envelope containing a gas fill that is energizeable to a discharge state, the envelope formed into a coiled configuration wound about a longitudinal axis and having first and second ends of the envelope disposed at one end of the coiled configuration wherein the legs are bent radially inward from the coiled configuration; and a base having first and second openings receiving the first and second ends, respectively, of the envelope therethrough in generally non-parallel relation to the longitudinal axis to reduce the overall height of the low pressure discharge lamp assembly.

2. The low pressure discharge lamp assembly as defined in claim 1 wherein the first and second ends of the envelope are oriented at an angle between zero and ninety degrees relative to the longitudinal axis of the coiled configuration.

3. The low pressure discharge lamp assembly as defined in claim 1 wherein the first and second ends of the envelope each include an electrode spaced from the base.

4. The low pressure discharge lamp assembly as defined in claim 1 wherein the envelope ends enter the base at generally opposite peripheral sidewall portions.

5. The low pressure discharge lamp as defined in claim 1 wherein the base includes a ballast assembly for driving the gas fill to a discharge state and an external threaded region at one end for threaded receipt in a socket.

6. The low pressure discharge lamp as defined in claim 1 wherein the base includes pins extending outwardly therefrom adapted for receipt in an associated plug-in socket that includes a ballast assembly for driving the gas fill to a discharge state.

7. The discharge lamp as defined in claim 1 wherein the envelope ends are received through first and second openings oriented at an angle and not in the direction of the axis of the lamp and generally across from each other.

8. The discharge lamp as defined in claim 7 wherein the openings are disposed in generally parallel first and second walls, respectively, the walls reducing the heat transfer from the envelope ends to the base.

9. The discharge lamp as defined in claim 1 wherein the first and second envelope ends each include an electrode disposed in the envelope isolated from the remainder of the base by a wall.

10. A method for securing first and second ends of an envelope of a low pressure discharge lamp coiled about a longitudinal axis to a base having first and second openings therein, the method comprising the steps of:

bending the first and second ends of the envelope radially inward toward the longitudinal axis; and inserting the bent first and second ends of the envelope through the first and second openings, respectively.

11. A low pressure discharge lamp assembly comprising:

an envelope containing a gas fill that is energizeable to a discharge state, the envelope formed into a double helix configuration of substantially constant diameter wound about a longitudinal axis wherein first and second ends of the envelope are disposed at a common end of the envelope, and the first and second ends are bent inwardly toward the longitudinal axis at a greater degree of curvature than the remainder of the substantially constant diameter envelope; and a base having first and second openings receiving the first and second ends, respectively, of the envelope therethrough in generally non-parallel relation to the longitudinal axis to reduce the overall height of the low pressure discharge lamp assembly.

12. The low pressure discharge lamp assembly as defined in claim 11 herein the first and second ends of the envelope are oriented at an angle between zero and ninety degrees relative to the longitudinal axis of the coiled configuration.

13. The low pressure discharge lamp assembly as defined in claim 11 wherein the first and second ends of the envelope each include an electrode spaced from the base.

14. The low pressure discharge lamp assembly as defined in claim 11 wherein the envelope ends enter the base at generally opposite peripheral sidewall portions.

15. The low pressure discharge lamp as defined in claim 11 wherein the base includes a ballast assembly for driving the gas fill to a discharge state and an external threaded region at one end for threaded receipt in a socket.

16. The low pressure discharge lamp as defined in claim 11 wherein the base includes pins extending outwardly therefrom adapted for receipt in an associated plug-in socket that includes a ballast assembly for driving the gas fill to a discharge state.

17. The discharge lamp as defined in claim 11 wherein the envelope ends are received through first and second openings oriented at an angle and not in the direction of the axis of the lamp and generally across from each other.

18. The discharge lamp as defined in claim 17 wherein the openings are disposed in generally parallel first and second walls, respectively, the walls reducing the heat transfer from the envelope ends to the base.

19. The discharge lamp as defined in claim 11 wherein the first and second envelope ends each include an electrode disposed in the envelope isolated from the remainder of the base by a wall.

* * * * *